Aug. 10, 1926.
J. B. JACOBS
UNIVERSAL JOINT
Filed Feb. 9, 1926
1,595,942
2 Sheets-Sheet 1
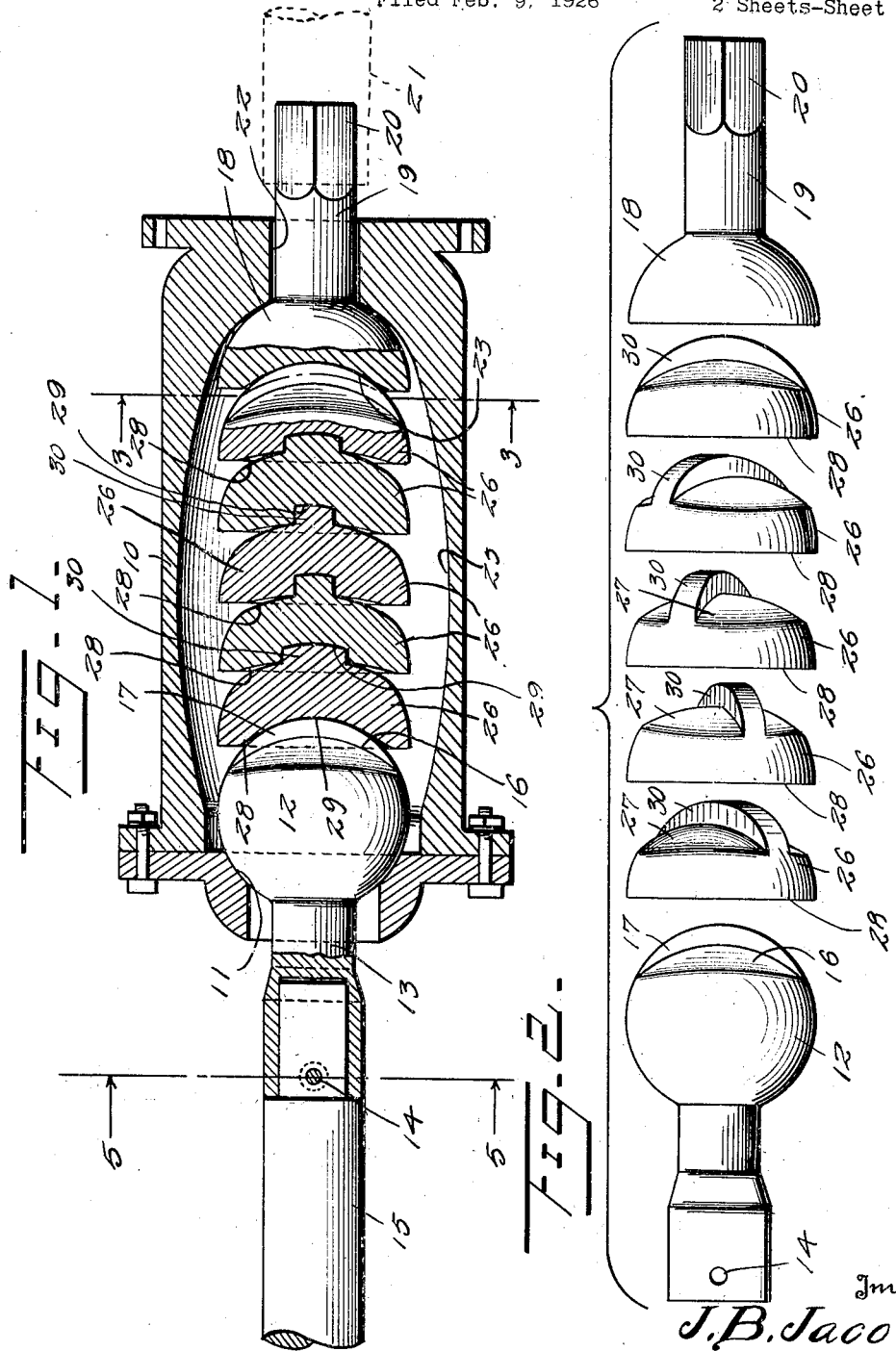
Inventor
J. B. Jacobs
By Watson E. Coleman
Attorney

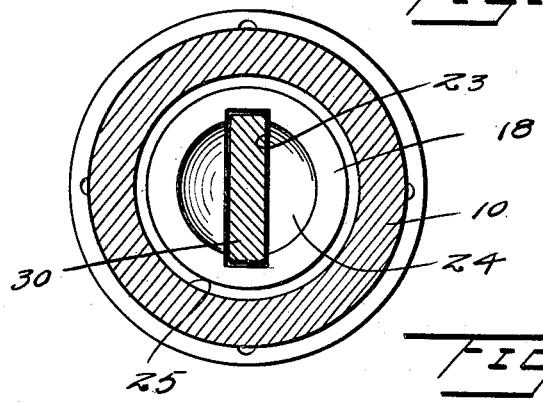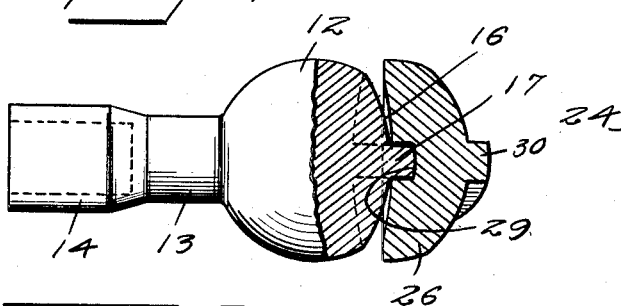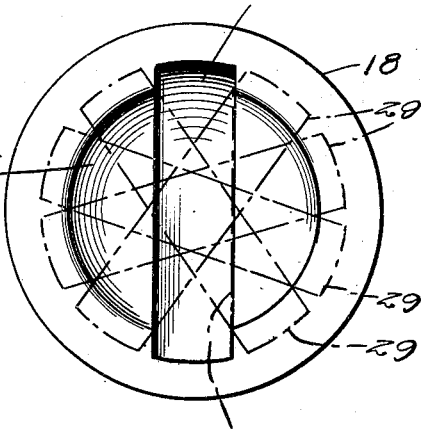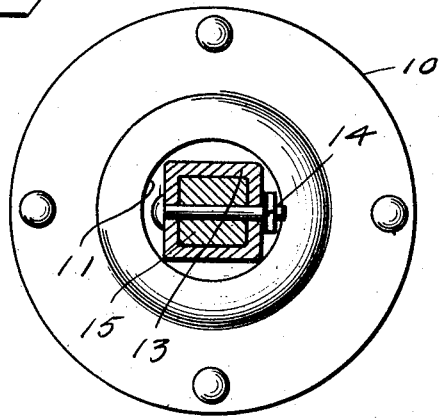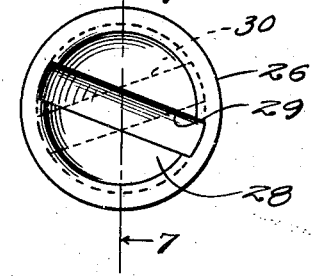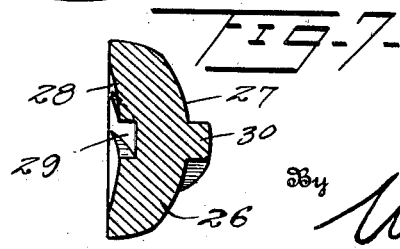

Patented Aug. 10, 1926.

1,595,942

UNITED STATES PATENT OFFICE.

JOHN B. JACOBS, OF OREGON CITY, OREGON.

UNIVERSAL JOINT.

Application filed February 9, 1926. Serial No. 87,151.

This invention relates to universal joints and the principal object of the invention is to provide an extremely flexible structure for connecting the adjacent ends of shafts so that these shafts will transmit rotary motion to one another and at the same time may be disposed at changing angles to one another.

A further object of the invention is to provide a device of this character which may be relatively cheaply manufactured including a series of duplicate elements which provide the flexible connection between the shafts.

A further object of the invention is to provide a connection of this character which may be conveniently housed.

A still further object of the invention is to provide a device where the strain caused by angular displacement of the shafts with relation to one another is reduced to a minimum.

These and other objects I attain by the construction shown in the accompanying drawings, wherein for the purpose of illustration is shown a preferred embodiment of my invention and wherein:—

Figure 1 is a longitudinal sectional view through a universal joint constructed in accordance with my invention;

Figure 2 is a combined side elevation of the elements of the universal joint in separated relation showing the angular displacement of the ribs of the various sections;

Figure 3 is a section on the line 3—3 of Figure 1;

Figure 4 is a side elevation partially in section of one end element;

Figure 5 is a section on the line 5—5 of Figure 1;

Figure 6 is a bottom plan view of one of the disk-like elements;

Figure 7 is a section on the line 7—7 of Figure 6;

Figure 8 is a bottom plan view of a disk-like element showing in dotted lines the relative positions of the ribs of this element and of the remaining elements.

Referring now more particularly to the drawings, the numeral 10 generally designates a housing, one end of which is formed to provide a curved socket 11 within which is seated an end joint element 12 which is adapted for connection with the movable shaft of the shafts which are to be connected. This element is in the form of a sphere having a stem 13 for projection through the end of the casing and adapted, as at 14, for engagement with the moving shaft 15 which may be, for example, the drive shaft of an automobile. The element 12 is notched upon its inner face, as at 16, to produce an upstanding rib 17. The notches 16 have their bases curved upon an arc of less magnitude than the curvature of the sphere forming the end member 12 and in the same general direction as the curvature of that portion of the sphere which is employed in constructing the rib 17. The opposite end of the housing has seated therein an end element 18 of the joint which is preferably semi-spherical and provided upon its outer face with a stem 19 adapted, as at 20, for engagement with a stationary or drive shaft 21. The engagement of this stem in the opening 22 of the end of the casing through which it passes is such that the element 18 and its stem are held against angular displacement with relation to the casing. The inner face of the element 18 is complementary to the inner face of the element 12, being provided with a groove 23 for the accommodation of a rib similar to the rib 17 and being curved as a whole to correspond to the curvature of the bases of the notches 16, as indicated at 24. The bore 25 of the casing 10 has a belly, increasing in diameter from the ends to the center thereof.

Arranged between the end members 12 and 18 are a plurality of disk-like elements 26, each having one face 27 thereof similar to the inner face of the element 12 and complementary to the inner face of the element 18 and the opposite face 28 thereof similar to the inner face of the element 18 and complementary to the outer face of the element 12. It will, of course, be obvious that the first named faces of the disks 26 being complementary to the element 18 will likewise be complementary to the faces 28 of the remaining disks so that it is immaterial in what order the disks are assembled within the casing. The groove 29 is angularly displaced with relation to the ribs 30 thereof and a sufficient number of disks should be employed between the members 12 and 18 to carry the displacement of the groove 23 of the end element 18 at least at right angles to the rib 17 of the element 12.

It will be obvious that if only one of these disks were employed and the rib 30 thereof disposed at right angles to the groove 29, then at certain points in the rotation of the drive shaft 21, a strain would be transmitted to the driven shaft 15. With a multiplication of the disks, the angle through which strain may be transmitted is reduced from a right angle to a very small acute angle whose value depends upon the angular displacement of the grooves and ribs of the disk.

It will also be obvious that the construction hereinbefore set forth is obviously capable of a certain range of change and modification without materially departing from the spirit of the invention and I accordingly do not limit myself to such specific structure except as hereinafter claimed.

I claim:—

A universal joint comprising shaft sections, one having at its inner end a rib, the inner face of which is arcuately curved, the other section having in its inner face a groove complementary to the rib, a plurality of disk-like elements disposed between said shaft sections and each having upon one face thereof a rib similar to the rib of the first named element and upon the opposite face thereof a groove similar to the groove of the second named element, the rib and groove of each of said disk-like elements being angularly displaced and having sliding movement with relation to one another and a housing for said sections and disk-like elements having at opposite ends thereof bearing seats for the shaft sections, the bore of the housing increasing in diameter toward the center thereof to thereby permit axial displacement of the disk-like elements.

In testimony whereof I hereunto affix my signature.

JOHN B. JACOBS.